UNITED STATES PATENT OFFICE.

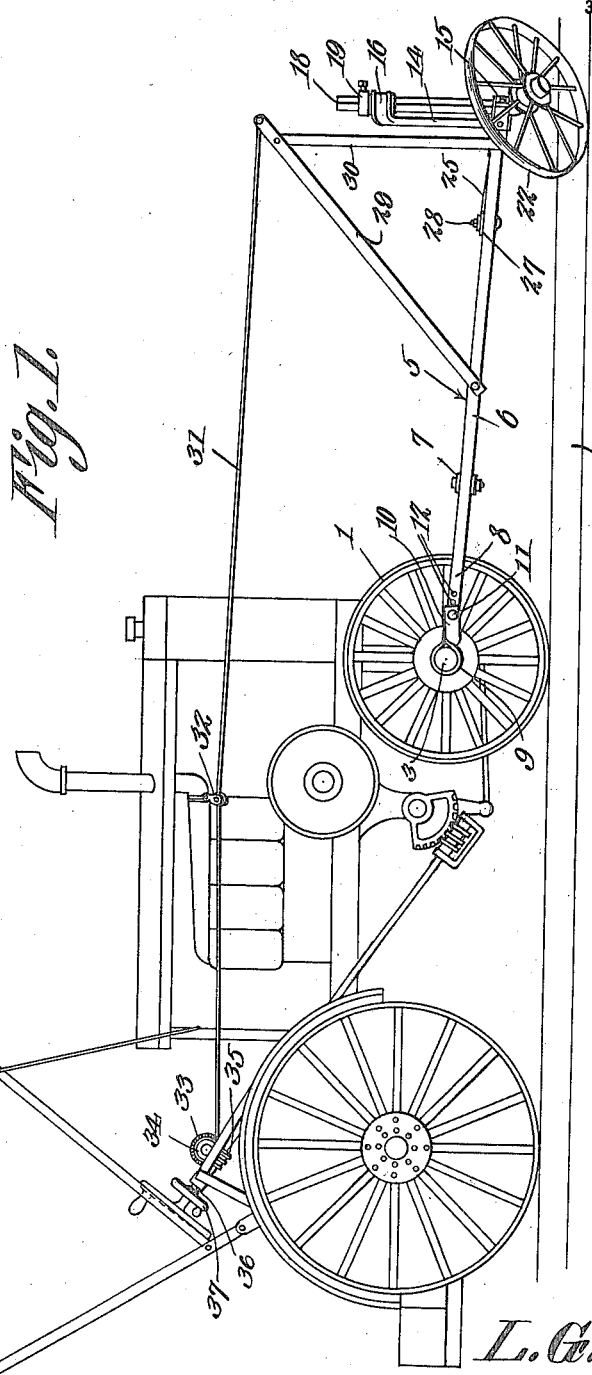

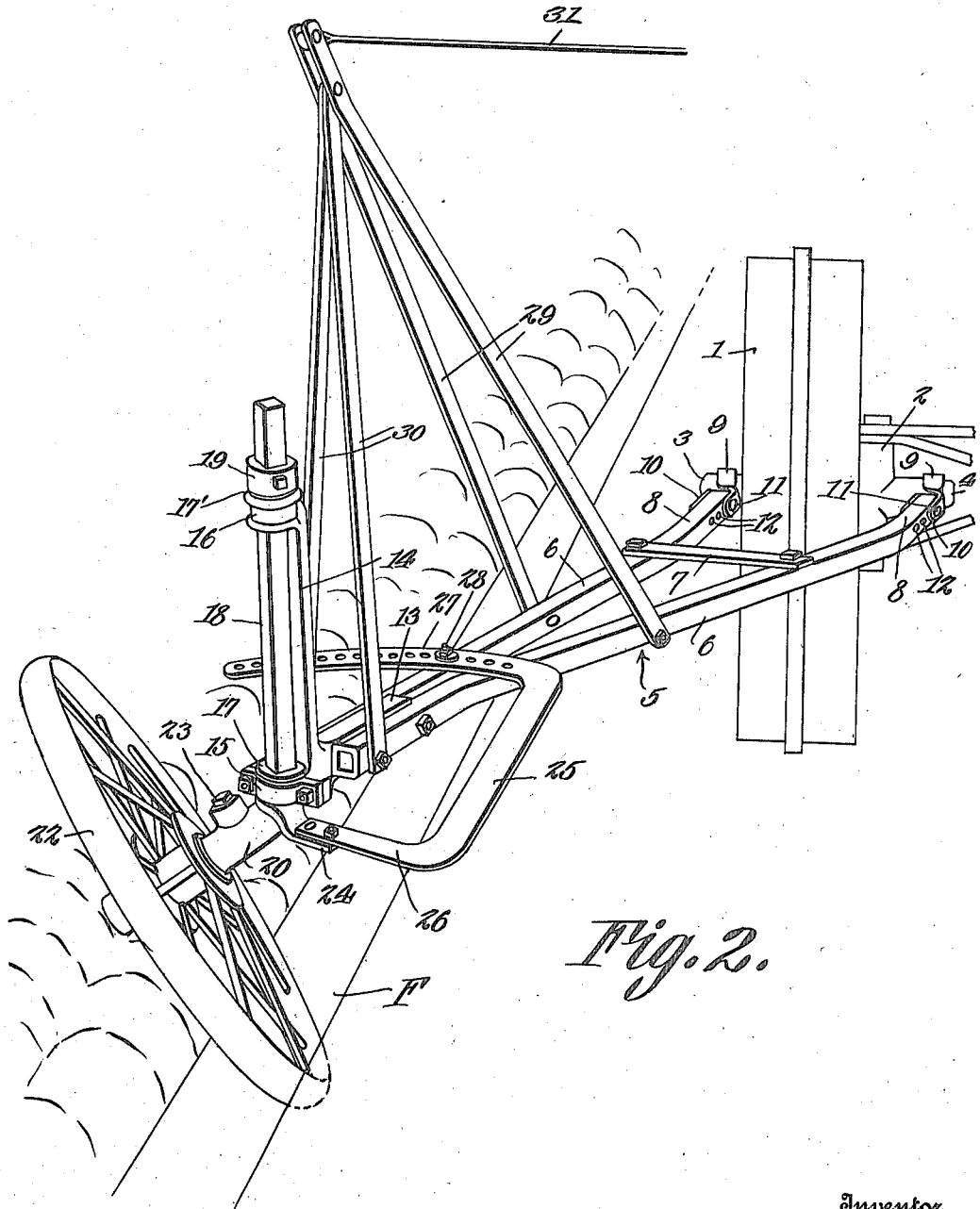

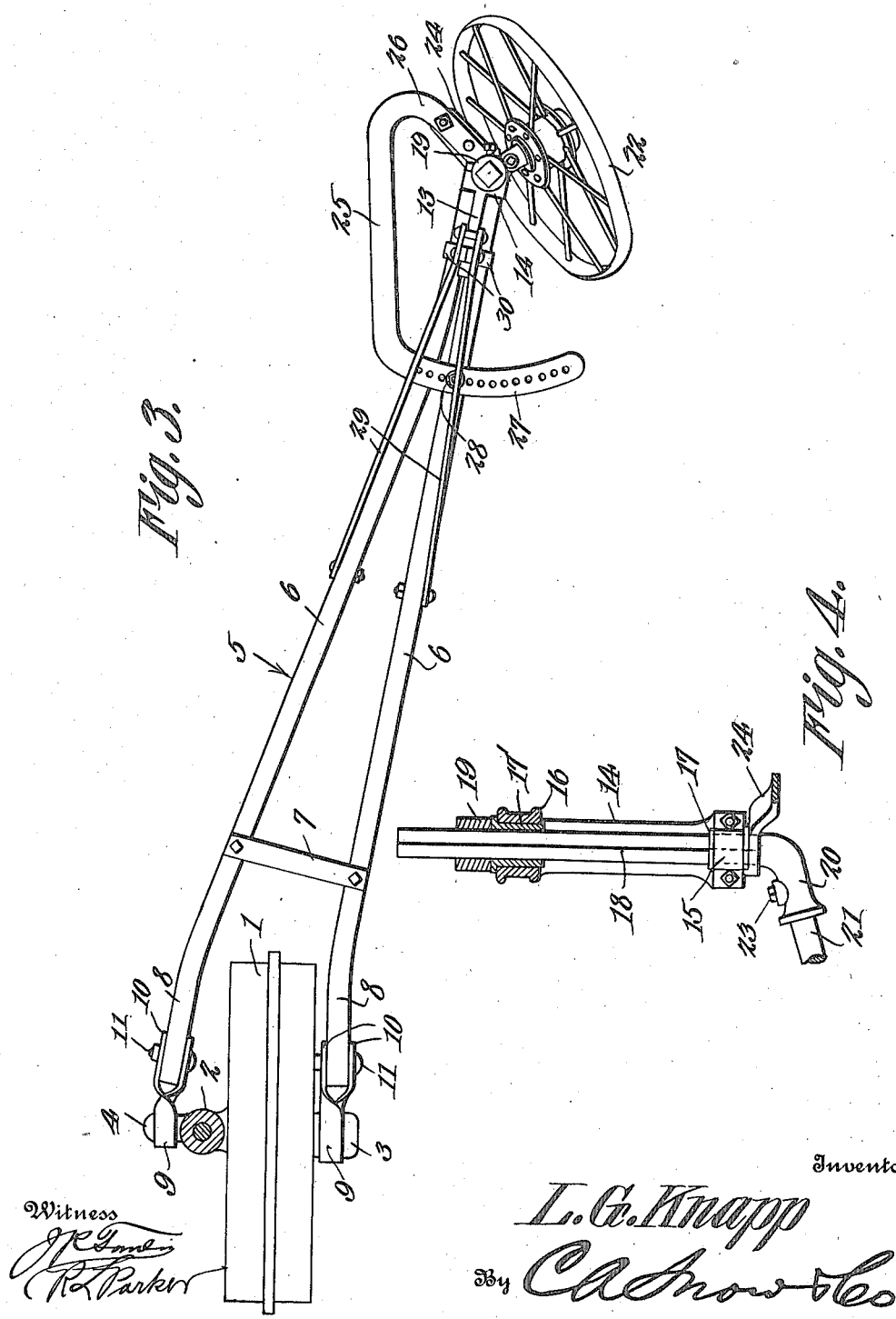

LLOYD G. KNAPP, OF LISBON, NORTH DAKOTA.

TRACTOR-GUIDE.

1,234,040.　　　　　Specification of Letters Patent.　　Patented July 17, 1917.

Application filed March 20, 1917. Serial No. 156,079.

*To all whom it may concern:*

Be it known that I, LLOYD G. KNAPP, a citizen of the United States, residing at Lisbon, in the county of Ransom and State of North Dakota, have invented a new and useful Tractor-Guide, of which the following is a specification.

The present invention appertains to devices for automatically guiding tractors when plowing, and aims to provide a tractor guide of novel and improved construction, whereby the device is thoroughly efficient for guiding the tractor along and at one side of the last furrow.

The present invention has among its objects, the provision of novel means for mounting and adjusting the guide wheel, the provision of novel means for raising the guide wheel when turning corners or turning the tractor around to enable the ordinary steering gear to be used, and to provide other advantageous features to enhance the utility and efficiency of the guiding mechanism.

With the foregoing and other objects in view which will appear as the description proceeds, the invention resides in the combination and arrangement of parts, and in the details of construction hereinafter described and claimed, it being understood that changes in the precise embodiment of the invention herein disclosed, can be made within the scope of what is claimed, without departing from the spirit of the invention.

The invention is illustrated in the accompanying drawings, wherein:—

Figure 1 is a side elevation of the guide as applied to a tractor.

Fig. 2 is a perspective view thereof, looking from the front.

Fig. 3 is a plan view of the device.

Fig. 4 is a sectional detail showing the standard for the guide wheel.

The tractor illustrated is of the conventional type, and being well known, a detailed illustration or description thereof is unnecessary. This tractor has front wheels, one of which is designated 1, and it is carried by a knuckle 2, in accordance with the prevailing practice in motor vehicles. The numeral 3 designates the hub cap or nut, while the knuckle 2 is provided at the inner side of the wheel with an inwardly projecting boss 4.

In order to swing the knuckle 2 about its vertical pivot for guiding the tractor, there is provided a guide pole or tongue 5 projecting forwardly, and composed of a pair of bars 6 which have their rear ends separated and which converge forwardly. The bars 6 are connected near their rear ends by a tie or cross piece 7, and the rear terminals of the bars 6 are bent slightly outward at an obtuse angle, as at 8, it being noted that the pole 5 and its bars extend at an acute angle toward one side from the longitudinal line of the wheel 1. The terminals 8 of the bars 6 are connected pivotally with the hub cap 3 and boss 4 to enable the pole 5 to be swung upwardly and downwardly, and for this purpose, bands 9 rotatably embrace the hub cap 3 and boss 4 at the outer and inner sides of the wheel 1, and are formed from doubled bars, so that the bands have forwardly projecting terminals 10 which overlap the outer and inner sides of the terminals 8. Bolts 11 or equivalent securing elements are engaged through the terminals 10 and through apertures 12 with which the terminals 8 are provided, each terminal 8 having a series of said apertures, whereby the bands 9 can be adjusted longitudinally relatively to the bars 6. In this manner, the angular position of the pole 5 can be adjusted to bring the free end of the pole the desired distance to one side of the tractor, whereby the tractor can be guided at different distances, within practical limits, from the last furrow F which is being used to guide the tractor and plows pulled thereby. When the pole 5 is swung toward one side or the other, this will correspondingly swing the knuckle 2 for angling the wheel 1 to steer the tractor, and by causing the free end of the pole 5 to follow the last furrow F, this will hold the wheel 1 in such a position, that the tractor will move parallel with the furrow, which is the function of the present guiding mechanism.

A casting or member 13 is bolted or otherwise clamped between the forward adjacent terminals of the bars 6, and has a bracket 14, a split bearing 15 at the lower end of said bracket, and a bearing 16 carried by the upper end of said bracket above the bearing 15. A sleeve 17 is journaled in the bearing 15, and a sleeve 17' is journaled in the bearing 16, and a vertical standard 18 of square or non-circular cross section extends slidably through similarly shaped openings in the sleeves 17 and 17'. A collar 19 is secured by means of a set screw or otherwise upon the standard 18 and rests upon the sleeve 17', to support the standard 18. The lower end of the standard has a portion 20 extending angularly downward and provided with a spindle 21 extending in the same direction. The guide wheel 22 is mounted for rotation upon the spindle 21 so that the axis of the wheel is inclined. The spindle 21 projects toward one side and forwardly, in order that the wheel 22 is canted or inclined toward the side toward which the pole 5 extends, said wheel also being inclined forwardly. The rim or tire of the wheel is curved transversely, so that the edges thereof will not tend to cling to the ground. An oil cup 23 or other suitable lubricating means is preferably carried by the portion 20 for supplying lubricant to lubricate the wheel.

In order to adjust the wheel 22 about the vertical axis of the standard 18, the lower sleeve 17 is provided at its lower end with a radially or laterally projecting arm 24, and a substantially longitudinal bar 25 at the inner side of the wheel 22 and forward end of the pole 5 is provided at its forward end with a bent back portion 26 bolted or otherwise fastened to the arm 24, while the rear free end of the bar 25 has an outwardly curved portion 27 provided with a series of apertures for the engagement of a bolt 28 or equivalent securing element carried by one bar 6. The portion 27 is curved about the standard 18 as a center, and by engaging various apertures of the portion 27 with the bolt 28, the angular position of the arm 24 and the sleeve 17 can be adjusted, and consequently the standard 18 and wheel 22 will be adjusted similarly. This enables the wheel 22 to be adjusted to make the forward inclination thereof more pronounced in some cases than others, when necessary or advisable.

As a means for raising the pole 5 and guide wheel 22, a pair of forwardly inclined bars 29 have their lower ends bolted or otherwise secured to the bars 6 between the ends of said bars 6, and a second pair of upwardly converging bars 30 have their lower ends bolted or otherwise fastened to the bars 6 near their forward ends, the upper ends of the bars 30 being secured between the bars 29 adjacent to their upper ends. The forward end of a cable or flexible element 31 is secured between the upper terminals of the bars 29, and is guided by a pulley or other suitable guide 32 carried by the corresponding side of the tractor. The rear end of the flexible element 31 is wound upon a drum 33 carried by the tractor. Said drum has a worm wheel 34 meshing with a worm 35 upon a short shaft 36 which has a crank handle 37 whereby the drum can be readily rotated for winding up the flexible element 31. The element 31 in being pulled rearwardly will pull the bars 29 and 30 likewise, thereby swinging the pole 5 upwardly and raising the guide wheel 22 from the ground. In this manner, the guide wheel can be raised to enable the ordinary steering gear of the tractor to be used for steering the tractor for turning corners or turning around at the end of the field. With the present mechanism, the ordinary steering gear is not rendered inoperative, and the lost motion thereof is sufficient to enable the front wheels 1 to be controlled by the pole 5 and the guide wheel 22.

In operation, when the pole 5 is lowered so that the guide wheel 22 runs in the last furrow F, the tilting of the guide wheel 22 toward the furrowed part of the field will cause the lower portion of the guide wheel 22 to run properly in the last furrow F, and the forward tilting of the guide wheel 22 will cause the guide wheel to cling to the landside of the furrow. Thus, the wheel 22 in being tilted forwardly has a tendency to run up the landside of the furrow, but since the rim or tire of the wheel 22 is rounded, it cannot climb up the landside of the furrow, the wheel slipping back into the furrow if there is any tendency for it to climb out of the furrow. Consequently, the guide wheel will bear against or cling to the landside of the furrow, resulting in the tractor being guided properly at the desired distance along the furrow. By adjusting the bar 25, the position of the wheel 22 is adjusted, to suit the conditions of the soil and the like. The guide wheel is not used for turning the tractor around at the end of the field, but is raised, as above described, in order that a shorter turn can be made by means of the ordinary steering gear. By providing the upwardly projecting bars or portions 29 and 30, the cable or flexible element 31 can extend rearwardly therefrom, so that a pull on the cable will raise the pole 5, without extending the cable upwardly an objectionable distance.

Having thus described the invention, what is claimed as new is:—

1. A tractor guide embodying a forwardly projecting pole, a bearing carried by the forward end thereof, a sleeve journaled in said bearing, a vertical standard engaged slidably through said sleeve and having a lower inclined spindle extending downwardly, a guide wheel rotatable upon said spindle, and means for holding said sleeve at various angular positions relatively to said pole.

2. A tractor guide embodying a forwardly projecting pole, a bearing carried by the forward end thereof, a sleeve journaled in said bearing, a vertical standard engaged slidably through said sleeve and having a lower inclined spindle extending downwardly, a guide wheel rotatable upon said spindle, an arm extending from said sleeve, and means connected to said arm and the pole for holding said sleeve and standard in various positions about the vertical axis of the standard.

3. A tractor guide embodying a forwardly projecting pole, a bearing carried by the forward end thereof, a sleeve journaled in said bearing, a vertical standard engaged slidably through said sleeve and having a lower inclined spindle extending downwardly, a guide wheel rotatable upon said spindle, an arm extending from said sleeve, a bar attached to said arm and having a portion extending across the pole, and means for adjustably securing said portion to the pole to hold said sleeve and standard in various angular positions about the axis of said standard.

In testimony that I claim the foregoing as my own, I have hereto affixed my signature in the presence of two witnesses.

LLOYD G. KNAPP.

Witnesses:
W. F. GRANGE,
ELMER T. SANDAGER.